UNITED STATES PATENT OFFICE.

MAX DOHRN AND ALBRECHT THIELE, OF BERLIN, GERMANY, ASSIGNORS TO CHEMISCHE FABRIK AUF ACTIEN (VORM. E. SCHERING), OF BERLIN, GERMANY.

METHOXYMETHYLMENTHOL.

994,445.

No Drawing.

Specification of Letters Patent. Patented June 6, 1911.

Application filed February 15, 1911. Serial No. 608,698.

*To all whom it may concern:*

Be it known that we, MAX DOHRN and ALBRECHT THIELE, doctors of philosophy, chemists, citizens of the German Empire, residing at Berlin, Kingdom of Prussia, German Empire, have invented a new and useful Improvement in the Production of Methoxymethylmenthol, of which the following is a specification.

Our invention relates to the manufacture of the hitherto unknown methoxymethylmenthol being a valuable pharmaceutical product. The new compound corresponds to the formula $C_{10}H_{19}.OCH_2.OCH_3$ and is a colorless liquid boiling at 7 millimeter pressure at about from 100 to 102 centigrade. The liquid which has a menthol like smell is insoluble in water, soluble in organic solvents and splits off formaldehyde on heating with mineral acids.

The methoxymethylmenthol is obtained by reacting with chlormethylether upon menthol in the presence of a condensing agent or upon an alkali salt of menthol. In carrying out our process practically we proceed, for instance, as follows: 2 molecules of chlormethylether are at ordinary temperature gradually added to 1 molecule of menthol sodium suspended in toluene. The addition takes place while stirring which is continued for some hours; after standing for about 24 hours the mother liquor is removed by suction. The toluene after purification of the filtrate *in vacuo* is distilled off and the residuum reactionated.

We claim as our invention:

The herein described new methoxymethylmenthol corresponding to the formula $C_{10}H_{19}.OCH_2.OCH_3$, being a colorless liquid boiling at 7 millimeter pressure at about from 100 to 102 centigrade, insoluble in water, soluble in organic solvents, having a menthol like smell, liberating formaldehyde on heating with mineral acids, and being a valuable therapeutic compound, substantially as described.

In testimony whereof we have hereunto set our signatures in the presence of two subscribing witnesses.

MAX DOHRN.
ALBRECHT THIELE.

Witnesses:
HENRY HASPER,
WOLDEMAR HAUPT.